July 10, 1928.　　　　R. B. BENJAMIN　　　　1,676,239
HOUSING CONSTRUCTION
Filed June 11, 1923　　　3 Sheets-Sheet 1
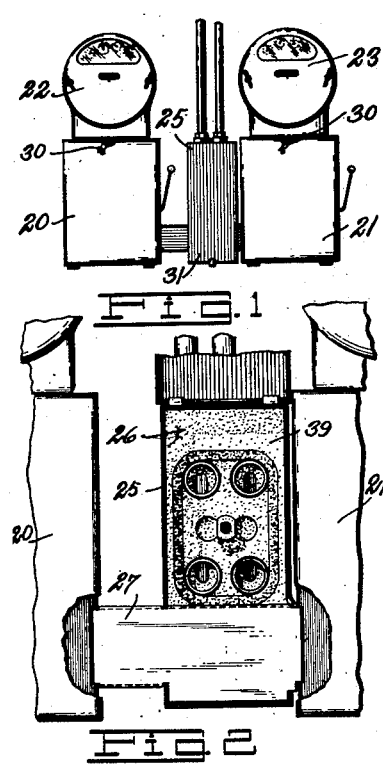
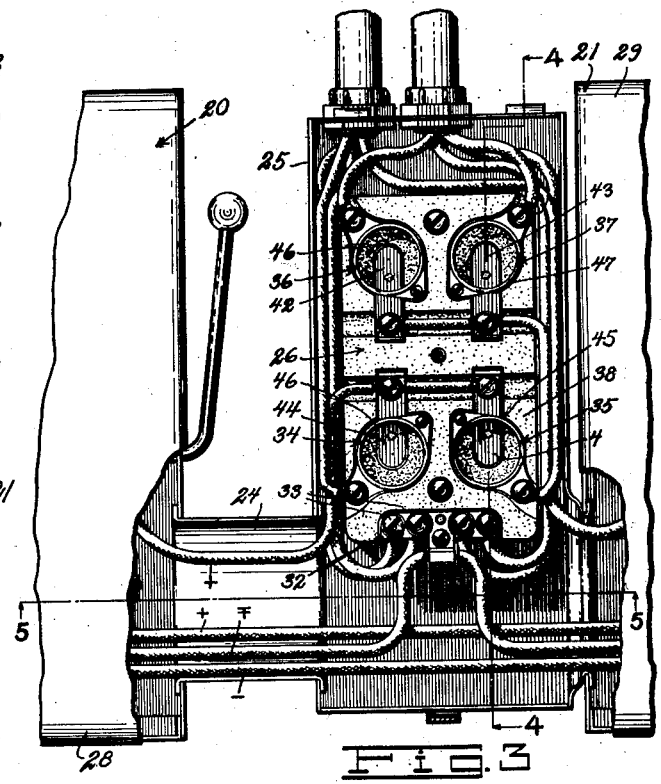
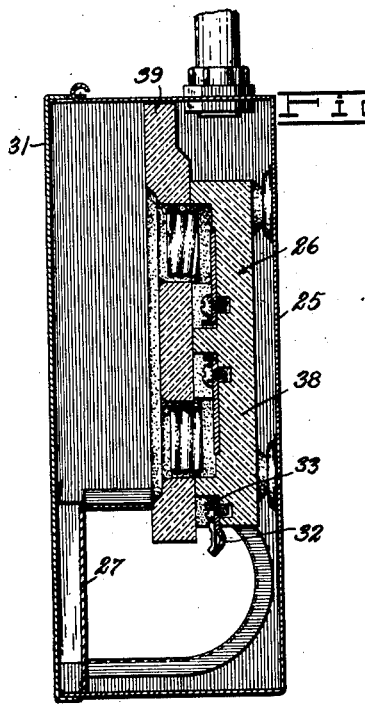
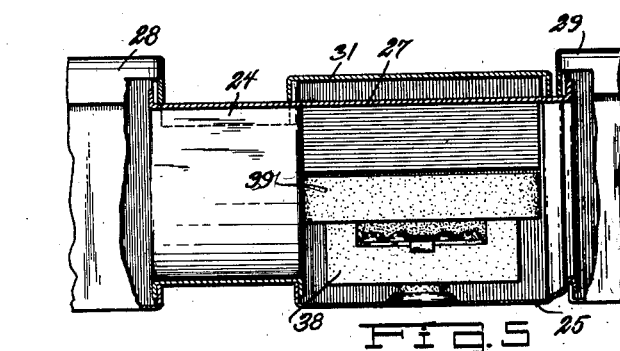
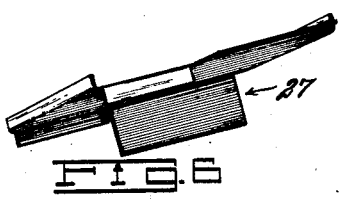
INVENTOR
Reuben B. Benjamin
BY
Jones Addington Ames & Seibold
ATTORNEYS July 10, 1928.
R. B. BENJAMIN
1,676,239
HOUSING CONSTRUCTION
Filed June 11, 1923    3 Sheets-Sheet 2
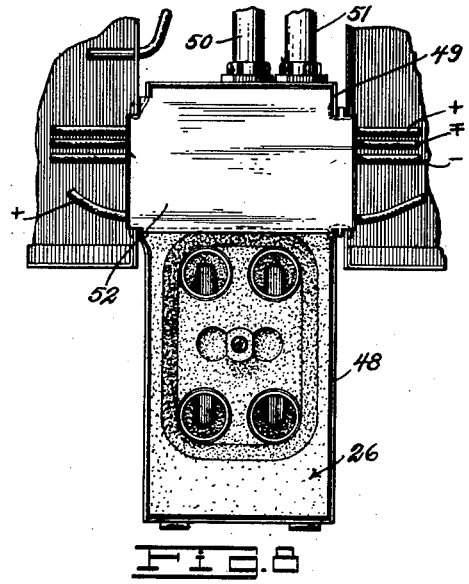
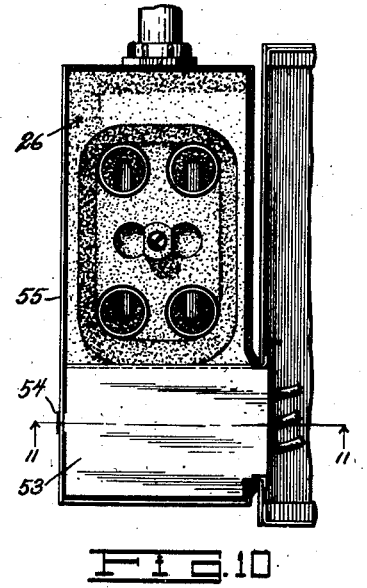
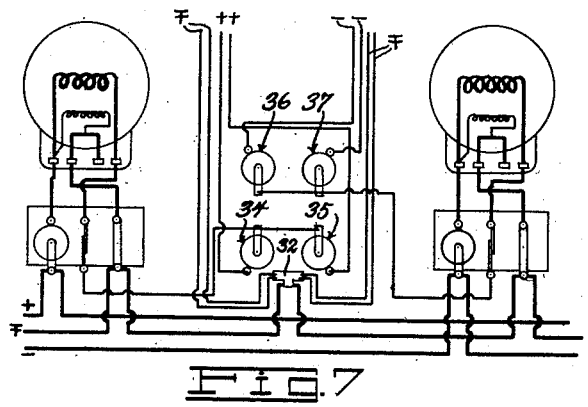
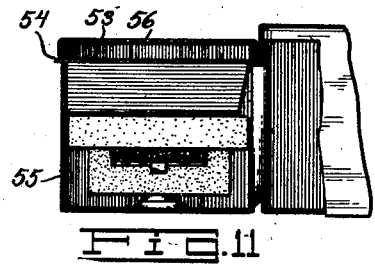
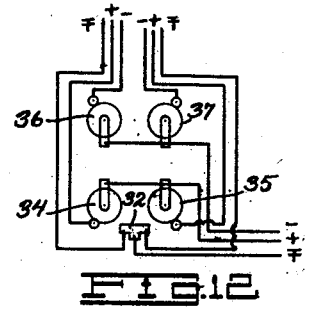
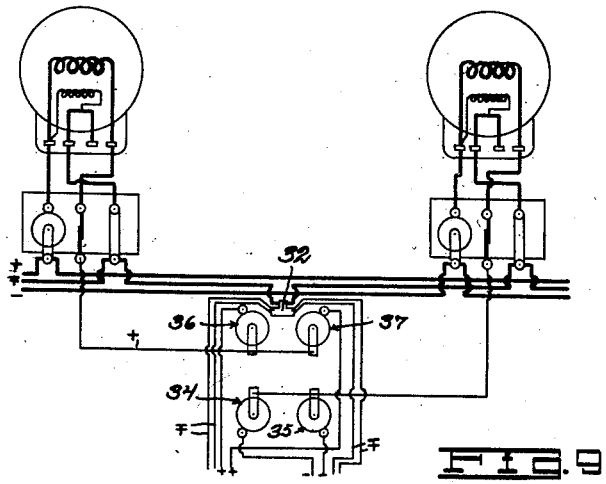
INVENTOR
Reuben B. Benjamin
BY
Jones Addington Ames & Seibold
ATTORNEYS July 10, 1928.
R. B. BENJAMIN
HOUSING CONSTRUCTION
Filed June 11, 1923
1,676,239
3 Sheets-Sheet 3
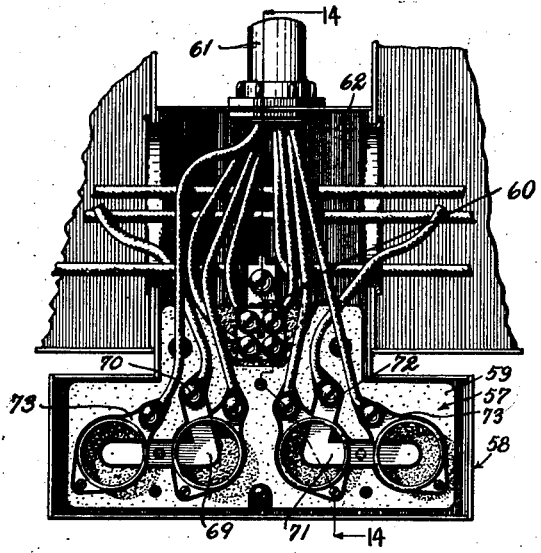
FIG. 13
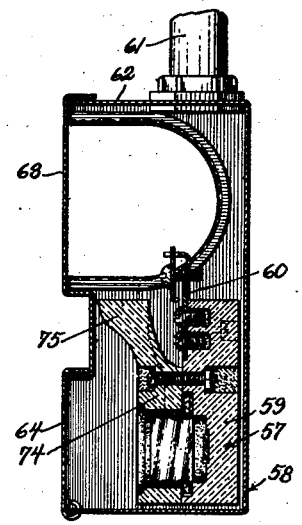
FIG. 14
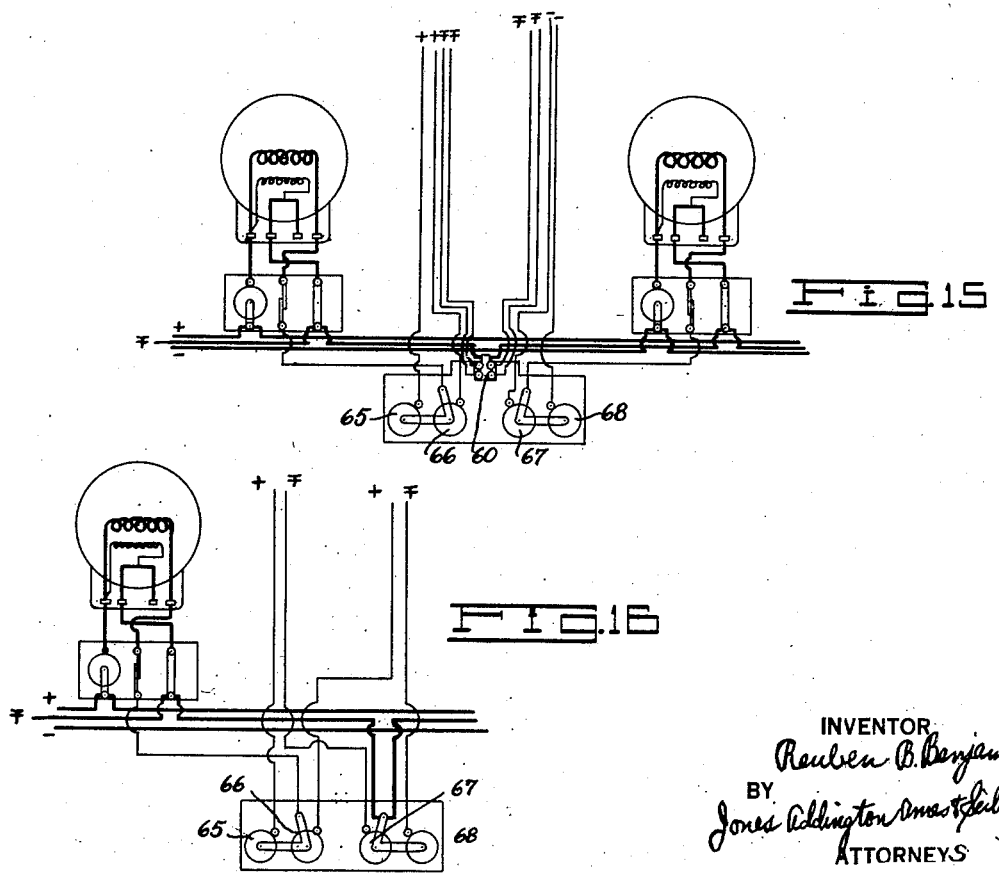
FIG. 15
FIG. 16
INVENTOR
Reuben B. Benjamin
BY
Jones Addington Ames & Seibold
ATTORNEYS Patented July 10, 1928.

1,676,239

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

HOUSING CONSTRUCTION.

Application filed June 11, 1923. Serial No. 644,564.

My invention relates to a housing construction for the branch over-load protective devices which are associated with the service boxes.

In certain electrical installations, it is desirable that the service boxes shall be closed and sealed so as not to be accessible to the tenant, but that the fuse receptacles for the branch circuits should be closed in such a manner that they will be readily accessible to the tenant.

One of the objects of my invention is to provide a housing construction for branch fuse receptacles or other over-load protective devices which will fulfill the above-indicated requirements.

A further object of my invention is to provide such a housing construction which will fit in well with present day service box construction.

Further objects will appear from the detailed description to follow and from the appended claims.

In the drawings, in which several forms of my invention are shown—

Figure 1 is a front elevation showing a pair of service boxes and the housing for the fuses for the branch wires;

Fig. 2 is an enlarged view of part of the construction shown in Fig. 1, showing the fuse block housing open;

Fig. 3 is a still further enlarged view similar to Fig. 2, showing the cover for the trough and the cover for the fuse receptacles removed;

Fig. 4 is a section on the line 4—4 of Fig. 3;

Fig. 5 is a section on the line 5—5 of Fig. 3;

Fig. 6 is a perspective view of the cover for the trough;

Fig. 7 is a wiring diagram showing one type of circuit which may be used;

Fig. 8 is a fragmentary view showing a different form of fuse block housing;

Fig. 9 is a wiring diagram showing a type of circuit which may be used with the construction shown in Fig. 8;

Fig. 10 is a view showing still another form of housing;

Fig. 11 is a section on the line 11—11 of Fig. 10;

Fig. 12 shows a wiring diagram of a circuit which may be used in the construction shown in Fig. 10;

Fig. 13 shows still another form of the fuse block housing;

Fig. 14 is a section on the line 14—14 of Fig. 13;

Fig. 15 is a wiring diagram showing a circuit which may be used with the construction of Fig. 13; and Fig. 16 is a diagram showing another circuit which may be used with the construction of Fig. 13.

Referring now to the drawings, in detail, it is to be noted that in all of the forms shown, a housing for the fuse block is provided which is in communication with a trough for the line wires extending laterally from a service box, and that in all but one of the forms shown, the trough referred to extends between a pair of service boxes to provide a passage for the line wires.

Referring now particularly to the construction shown in Figs. 1 to 6, inclusive, this comprises a pair of service boxes 20 and 21, on which the meters 22 and 23 are mounted, and a housing construction comprising a trough 24 for the passage of the line wires from one service box to the other, and comprising also a box 25 for the fuse block 26. This housing construction may be of pressed or stamped sheet metal. The service boxes and meters may be of any usual or suitable construction and need not be described in detail. The particular type of fuse block used is not of particular importance so far as the invention claimed in this application is concerned, but will be described somewhat in detail hereinafter.

A sheet metal cover 27 is provided for the trough portion of the housing, this cover not being removable by the tenant, as it is held in place by the covers 28 and 29 of the service boxes, which are sealed and not to be opened by the tenant, as indicated at 30. However, a hinged cover 31 is provided for the fuse block box, which can be readily opened by the tenant, to expose the fuse block to enable the tenant to replace the branch fuse plugs when necessary.

Before describing in detail the fuse block, a brief description of the wiring diagram shown in Fig. 7 will be given. As indicated herein, the neutral line wire is electrically connected with a binding plate 32 (Figs. 3 and 4), having a number of binding terminals 33 for the neutral branch wires connected thereto. The positive line wire is electrically connected with the two lower fuse receptacles 34 and 35 (Fig. 2) to which the positive branch wires are connected. The negative line wire leads from the right-hand service box and is electrically connected with the upper pair of fuse receptacles 36 and 37 from which the negative branch wires lead. As indicated in Figs. 3 and 7, there are thus derived four two-wire branch circuits with fuses for the positive and negative branch wires, but with no fuses for the neutral branch wires.

Referring now somewhat more specifically to the fuse block construction, this comprises an insulating base 38 on which the fuse receptacles and wiring terminals for the neutral branch wires are mounted, and an insulating cover 39 providing insulation for the fuse receptacle contacts. The positive line wire is electrically connected with the center contacts 40 and 41 of the lower pair of fuse receptacles and the negative line wire is electrically connected with the center contacts 42 and 43 of the upper pair of fuse receptacles. The positive branch wires are electrically connected with the shell contacts 44 and 45 of the lower pair of fuse receptacles and the negative branch wires are electrically connected with the shell contacts 46 and 47 of the upper pair of fuse receptacles.

The construction shown in Fig. 8 is quite similar to the construction shown in Figs. 1 to 6, inclusive, except that in Fig. 8 the box 48 in which the fuse block is mounted, is underneath the trough portion 49 which extends between the service boxes and the conduits 50 and 51 for the branch wires lead from the trough portion instead of from the fuse block box as in Fig. 3. In Fig. 8 a cover 52 for the trough is provided which is locked in place underneath the covers for the service boxes just as in the form shown in Figs. 1 to 6. A hinged cover (not shown), readily operable by the tenant, is provided for covering the fuse block just as in the form shown in Figs. 1 to 6.

Fig. 9 shows a wiring diagram of a circuit which may be used with the construction shown in Fig. 8. As shown therein, the neutral line wire is electrically connected with the binding plate 32 to which the four neutral branch wires are electrically connected. The positive line wire leading from the right-hand service box is electrically connected with the two upper fuse receptacles 36 and 37, to which the two positive branch wires are electrically connected. The negative line wire from the right-hand service box is electrically connected with the two lower fuse receptacles 34 and 35 to which the two negative branch wires are electrically connected. Four two-wire branch circuits are thus derived, with fuses for the positive and negative branch wires but with no fuses for the neutral branch wires.

The construction shown in Figs. 10 and 11 is quite similar to that shown in Figs. 1 to 6, inclusive, except that in Fig. 10 the trough for the passage of the line wires is in communication with only one service box. In this form, a cover 53 is provided for the trough portion, having one end held in place by a lug 54 which extends through an opening in the housing 55 and having its other end locked underneath the cover of the service box. In this form also a sheet metal cover 56, readily operable by the tenant, is provided for covering the fuse block.

Fig. 12 shows a wiring diagram of a circuit which may be used with the construction of Fig. 10. As shown therein, the neutral line wire leads from the service box to the binding plate 32 to which the two neutral branch wires are connected. The positive line wire leads to the lower fuse receptacles 34 and 35 to which the two positive branch wires are connected, respectively, and the negative line wire is electrically connected with the upper fuse receptacles 36 and 37 to which the two negative branch wires are electrically connected.

There are thus derived two three-wire branch circuits, the positive and negative branch wires being provided with fuses and the neutral branch wires being unfused.

The construction shown in Figs. 13 and 14 is along the same general line as the construction previously described, but in this form, the fuse block 57 is considerably wider than the fuse block shown in the other forms and has the fuse receptacles arranged in a transversely extending row, and the fuse block box 58 is considerably wider than the space between the service boxes and is located underneath the service boxes. The insulating base 59 of the fuse block has a portion on which the binding plate 60 for the neutral wires is mounted, lying in that portion of the housing between the two service boxes. The conduit 61 for the branch circuits leads from the upper portion of the trough 62 in which the line wires lie. In this form also a cover 63 is provided for the trough 62, this cover being locked in place underneath the covers for the service boxes, and a hinged cover 64 is provided for the fuse receptacles, this latter cover being readily operable by the tenant.

Before describing in further detail the construction of the fuse block and housing, the wiring diagrams shown in Figs. 15 and 16 will be described. Referring first to Fig. 15, as shown therein, the neutral line wire is electrically connected with the neutral binding plate 60 to which the four neutral branch wires are connected. The positive line wire is electrically connected with the two left-hand fuse receptacles 65 and 66 to which the two positive branch wires are connected, respectively, and the negative line wire is electrically connected with the two right-hand fuse receptacles 67 and 68 to which the two negative branch wires are connected, respectively. There are thus derived four two-wire branch circuits, with fuses for the positive and negative branch wires, but with no fuses for the neutral branch wires.

Fig. 16 shows a circuit in which the neutral line wire is electrically connected with the two right-hand fuse receptacles 67 and 68 to which the two neutral branch wires are connected, respectively, and in which the positive line wire is electrically connected with the two left-hand fuse receptacles 65 and 66, to which the two positive branch wires are connected respectively. There are thus derived two two-wire branch circuits with fuses both for the positive branch wires and also for the neutral branch wires.

Referring now somewhat more in detail to the construction of the fuse block, the center contacts for the two left-hand receptacles are formed as parts of an L-shaped metal stamping 69 having a binding plate portion to which the line wire may be connected as indicated at 70. The center contacts for the two right-hand fuse receptacles are formed as parts of an L-shaped metal stamping 71 having a binding plate portion to which another line wire may be connected as indicated at 72. The shell contacts of the fuse receptacles are provided with lateral extensions as indicated at 73 forming binding plate portions for the branch wires. An insulating cover 74 is provided for insulating the fuse receptacle contacts, having an upwardly extending portion 75 overlying the neutral binding plate 60 and covering the branch wires leading from the fuse receptacles.

While I have shown several forms of my invention, it is obvious that it may be embodied in other forms covered and defined by the appended claims.

What I claim as new and desire to secure by Letters Patent of the U. S. is:—

1. The combination with a pair of sealed service boxes, of a housing comprising a passageway for the passage of the line wires from one box to the other and comprising also a box opening into the side of said passageway for the branch overload protective devices having an unsealed closure.

2. The combination with a pair of sealed service boxes, of a housing comprising a passageway for the passage of the line wires from one box to the other and comprising also a box opening into the side of said passageway for the branch overload protective devices having an unsealed closure which when opened affords access to the overload protective devices, said passageway having a sealed closure preventing access to the line wires.

3. The combination with a sealed service box, of a housing comprising a passageway for the passage of line wires from said housing extending laterally from said box and comprising also a box opening into the side of said passageway for the branch overload protective devices extending vertically from said trough and having an unsealed closure which when opened affords access to the overload protective devices.

4. The combination with a pair of sealed service boxes, of a housing comprising a passageway for the passage of the line wires from one box to the other, and comprising also a box opening into the side of said passageway for the branch overload protective devices extending upwardly from the trough between the service boxes and having an unsealed closure which when opened affords access to the overload protective devices.

5. The combination with a sealed service box, of a housing comprising a passageway for the passage of line wires from said housing extending laterally from said box and also comprising a box opening into the side of said passageway for the branch overload protective devices extending vertically from said passageway and having an unsealed closure which when opened affords access to the overload protective devices, said passageway having a closure preventing access to the line wires.

6. The combination with a service box construction having a sealed closure means, of a housing construction comprising (1) a wiring passageway for the line wires having a cover locked by said sealed closure and (2) a box opening into the side of said passageway for the branch overload protective devices, said box having an unsealed closure which when opened affords access to the overload protective devices.

7. The combination with a a service box construction having sealed closure means, of a housing construction comprising (1) a wiring passageway for the line wires having a cover locked by said sealed closure and (2) a box opening into the side of said passageway for the branch overload protective devices, said box having an unsealed closure which when opened affords access to the overload protective devices, and extending across in front of said cover.

8. In combination, a pair of sealed service boxes, means forming a passageway for wires between said boxes, a sealed cover for said passageway, said means also including a housing communicating with said passageway, overload protective devices in said latter housing having line terminals beneath said passageway cover, and a cover for the housing permitting access to the overload devices.

9. Meter and service connection protective means comprising a sealed service box and an adjacent housing said means providing a passageway between said box and housing, a sealed cover for a portion of said housing and said passageway, overload protective devices in said housing having inaccessible terminals beneath said cover and an unsealed cover for said housing permitting access to said overload devices.

In witness whereof, I have hereunto subscribed my name.

REUBEN B. BENJAMIN.